United States Patent
Cheng et al.

(10) Patent No.: US 8,885,105 B1
(45) Date of Patent: Nov. 11, 2014

(54) SYSTEMS AND METHODS FOR PERFORMING REGION-BASED LOCAL CONTRAST ENHANCEMENT

(71) Applicant: Cyberlink Corp., Shindian (TW)

(72) Inventors: Chih-Yu Cheng, Taipei (TW); Yu-En Lin, Pingtung County (TW)

(73) Assignee: Cyberlink Corp., Shindian, Taipei (TW)

( * ) Notice: Subject to any disclaimer, the term of this patent is extended or adjusted under 35 U.S.C. 154(b) by 0 days.

(21) Appl. No.: 14/148,891

(22) Filed: Jan. 7, 2014

Related U.S. Application Data

(60) Provisional application No. 61/835,729, filed on Jun. 17, 2013.

(51) Int. Cl.
- *H04N 9/64* (2006.01)
- *G06K 9/00* (2006.01)
- *H04N 9/79* (2006.01)
- *G11B 27/031* (2006.01)
- *G06T 5/00* (2006.01)

(52) U.S. Cl.
CPC ........... *G06T 5/008* (2013.01); *H04N 9/79* (2013.01); *G11B 27/031* (2013.01)
USPC ............................. 348/679; 382/167; 382/274

(58) Field of Classification Search
USPC ................. 348/254–256, 678, 679, 624, 612; 382/162, 167, 274; 345/589, 593, 611, 345/617
See application file for complete search history.

(56) References Cited

U.S. PATENT DOCUMENTS

| | | | |
|---|---|---|---|
| 6,075,890 A | 6/2000 | Park | |
| 8,175,382 B2 * | 5/2012 | Liu et al. | 382/167 |
| 8,285,040 B1 | 10/2012 | Movshovich et al. | |
| 2005/0031201 A1 | 2/2005 | Goh | |
| 2007/0170798 A1 | 7/2007 | Gohin et al. | |
| 2009/0285478 A1 * | 11/2009 | Thiebaud et al. | 382/166 |
| 2013/0230237 A1 * | 9/2013 | Schlosser et al. | 382/164 |
| 2013/0322753 A1 * | 12/2013 | Lim et al. | 382/167 |
| 2014/0193066 A1 * | 7/2014 | Richert | 382/158 |

* cited by examiner

*Primary Examiner* — Victor Kostak
(74) *Attorney, Agent, or Firm* — McClure, Qualey & Rodack, LLP

(57) ABSTRACT

Local contrast enhancement comprises obtaining a first frame as a reference frame and a second frame as a current frame. The reference frame is partitioned into a plurality of reference regions, and a first color mapping function is derived for at least one of the reference regions in the reference frame according to the corresponding color distribution. The first color mapping function comprises, for at least one of a predetermined set of colors, a first source color value and a first contrast-enhanced color value. The current frame is partitioned into a plurality of regions, and a second color mapping function is derived for at least one of the regions in the current frame according to the first color mapping functions of at least two of the reference regions in the reference frame. The second color mapping function is applied to generate a contrast-enhanced frame.

30 Claims, 9 Drawing Sheets

SYSTEMS AND METHODS FOR PERFORMING REGION-BASED LOCAL CONTRAST ENHANCEMENT

CROSS-REFERENCE TO RELATED APPLICATION

This application claims priority to, and the benefit of, U.S. Provisional Patent Application entitled, "Systems and Methods for Performing Video Local Contrast Enhancement," having Ser. No. 61/835,729, filed on Jun. 17, 2013, which is incorporated by reference in its entirety.

BACKGROUND

Global contrast enhancement increases the global contrast of images, particularly when the usable data of the image is represented by close contrast values. Through this technique, the intensities can be better distributed on the histogram, thereby allowing areas of lower contrast to gain a higher contrast. However, when applying global contrast enhancement to images, the contrast in the local domain may be decreased, thereby resulting in a loss of details. Therefore, local contrast enhancement is applied to address these problems. However, when applying local contrast enhancement to video content, flicker may arise if temporal consistency is not considered.

SUMMARY

Briefly described, one embodiment, among others, is a local contrast enhancement method performed in a video editing system, comprising obtaining a first frame and a second frame in a video, wherein the first frame is designated as a reference frame and the second frame is designated as a current frame. The method further comprises partitioning the reference frame into a plurality of reference regions, determining a color distribution for at least one of the reference regions in the reference frame, and deriving a first color mapping function for at least one of the reference regions in the reference frame according to the corresponding color distribution, wherein the first color mapping function comprises, for at least one of a predetermined set of colors, a first source color value and a first contrast-enhanced color value. The method further comprises partitioning the current frame into a plurality of regions, deriving a second color mapping function for at least one of the regions in the current frame according to the first color mapping functions of at least two of the reference regions in the reference frame, and applying the second color mapping function to the at least one of the regions in the current frame to generate a contrast-enhanced frame.

Another embodiment is a system for performing local contrast enhancement. The system comprises a processor and at least one application executable in the processor, the at least one application comprising a media interface for obtaining a reference frame and a current frame in a video, a frame processor for partitioning the reference frame into a plurality of reference regions, and a frame analyzer for determining a color distribution for at least one of the reference regions in the reference frame. The at least one application further comprises a color mapper for deriving a first color mapping function for at least one of the reference regions in the reference frame according to the corresponding color distribution, wherein the first color mapping function comprises, for at least one of a predetermined set of colors, a first source color value and a first contrast-enhanced color value, wherein the frame processor is further configured to partition the current frame into a plurality of regions, wherein the color mapper is further configured to derive a second color mapping function for at least one of the regions in the current frame according to the first color mapping function for at least two of the reference regions in the reference frame. The at least one application further comprises a frame enhancer for applying the second color mapping function to the at least one of the regions in the current frame to generate a contrast-enhanced frame.

Another embodiment is a non-transitory computer-readable medium embodying a program executable in a computing device, comprising code that obtains a reference frame and a current frame in a video, code that partitions the reference frame into a plurality of reference regions, code that determines a color distribution for at least one of the reference regions in the reference frame, and code that derives a first color mapping function for at least one of the reference regions in the reference frame according to the corresponding color distribution, wherein the first color mapping function comprises, for at least one of a predetermined set of colors, a first source color value and a first contrast-enhanced color value. The program further comprises code that partitions the current frame into a plurality of regions, code that derives a second color mapping function for at least one of the regions in the current frame according to the first color mapping function for at least two of the reference regions in the reference frame, and code that applies the second color mapping function to the at least one of the regions in the current frame to generate a contrast-enhanced frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Histogram equalization is one contrast enhancement technique used for increasing the contrast levels of images by effectively spreading out the most frequent intensity values. The contrast of various regions within a frame is adjusted so that fine details in darker regions, for example, are enhanced for the viewer. With global histogram equalization techniques, the spatial histogram of an image is adjusted to closely match a uniform distribution. As discussed above, when applying global contrast enhancement to images, the contrast in the local domain may be decreased, thereby resulting in a loss of details. Therefore, local contrast enhancement is applied to address these problems. However, when applying local contrast enhancement in video content, flicker may arise if temporal consistency is not considered in local contrast enhancement.

Figure 5:
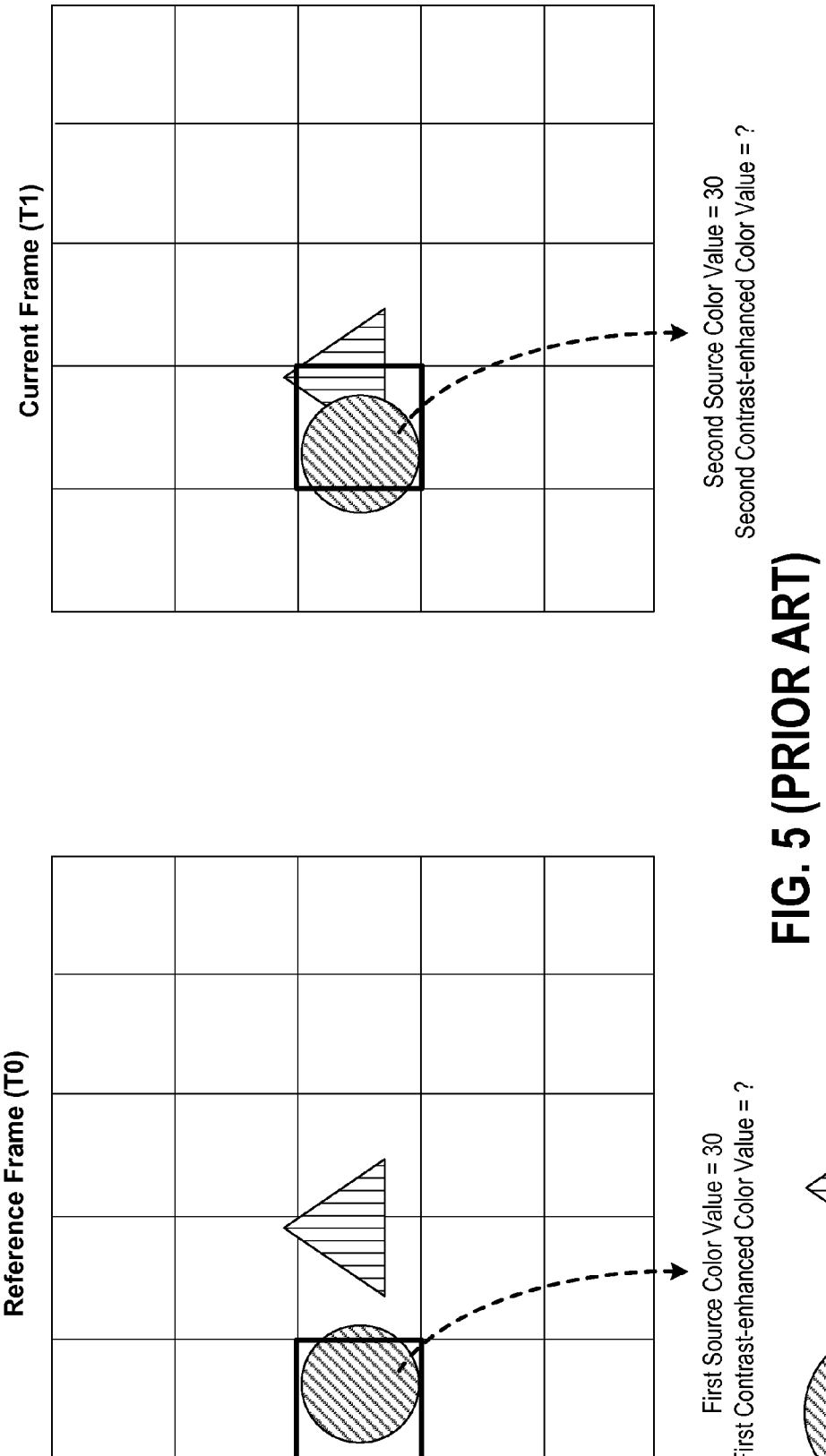
FIGS. 5 and 6 illustrates the occurrence of flicker as a result of applying local contrast enhancement according to conventional techniques.
Figure 6:
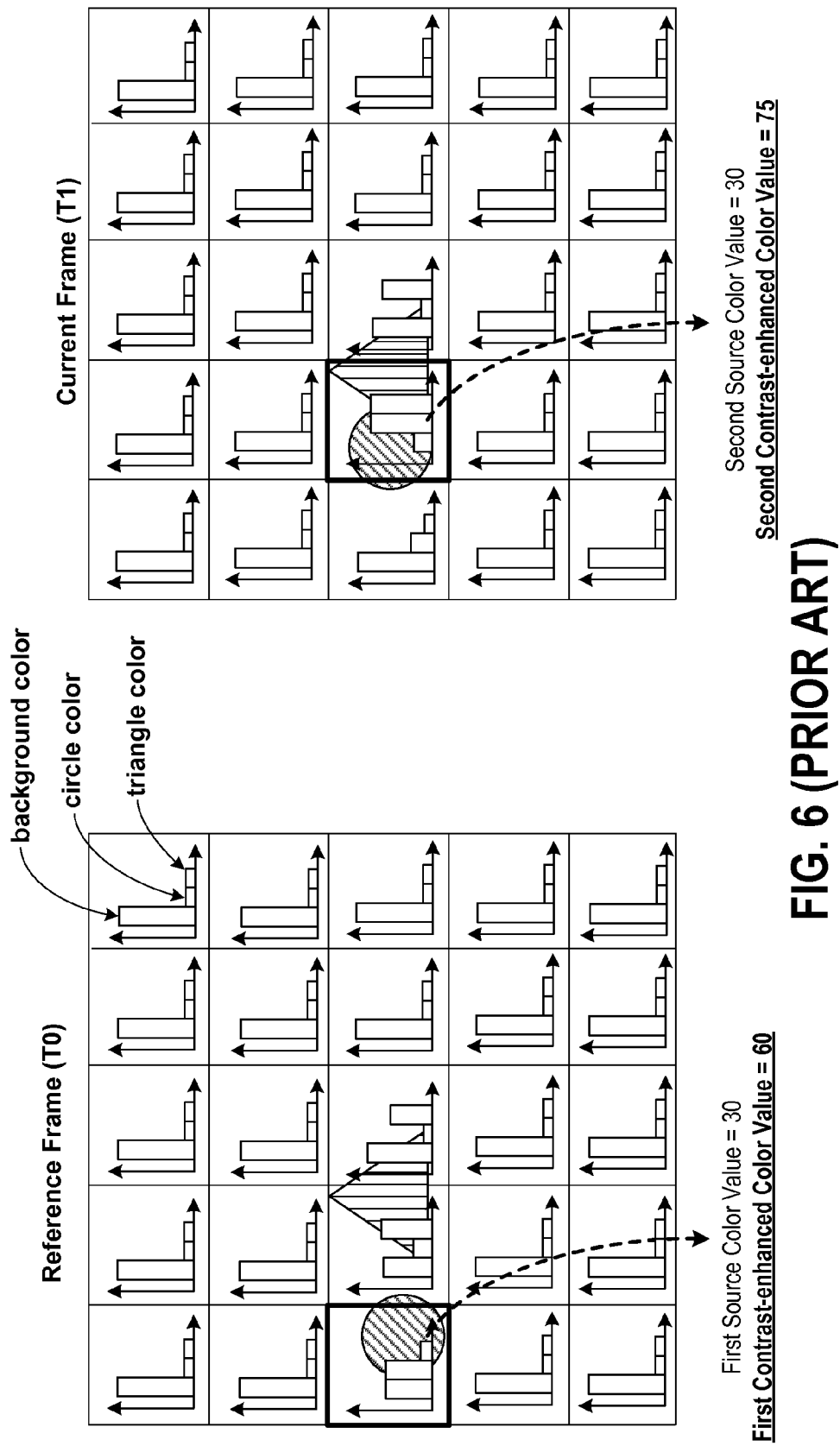

To illustrate, reference is made to FIG. 5 and FIG. 6, which illustrate the application of global histogram equalization to video frames. FIG. 5 shows a reference frame at time T0 and a current frame at time T1, where each frame is partitioned into a plurality of regions. The circle object represents a portion within the frame having a first color (color A) while the triangle object represents a portion within the frame having a second color (color B). Notably, the color distribution or histogram information for each region in the current frame (T1) is utilized in an independent fashion to determine the color mapping for that region. As shown in FIG. 6, the circle object has a color value of 30 in the reference frame. However, in the current frame (T1), the circle object maps to different results (values 60 and 75) due to the presence of the triangle object within the same general area of the frame, thereby resulting in flicker.

Figure 7:
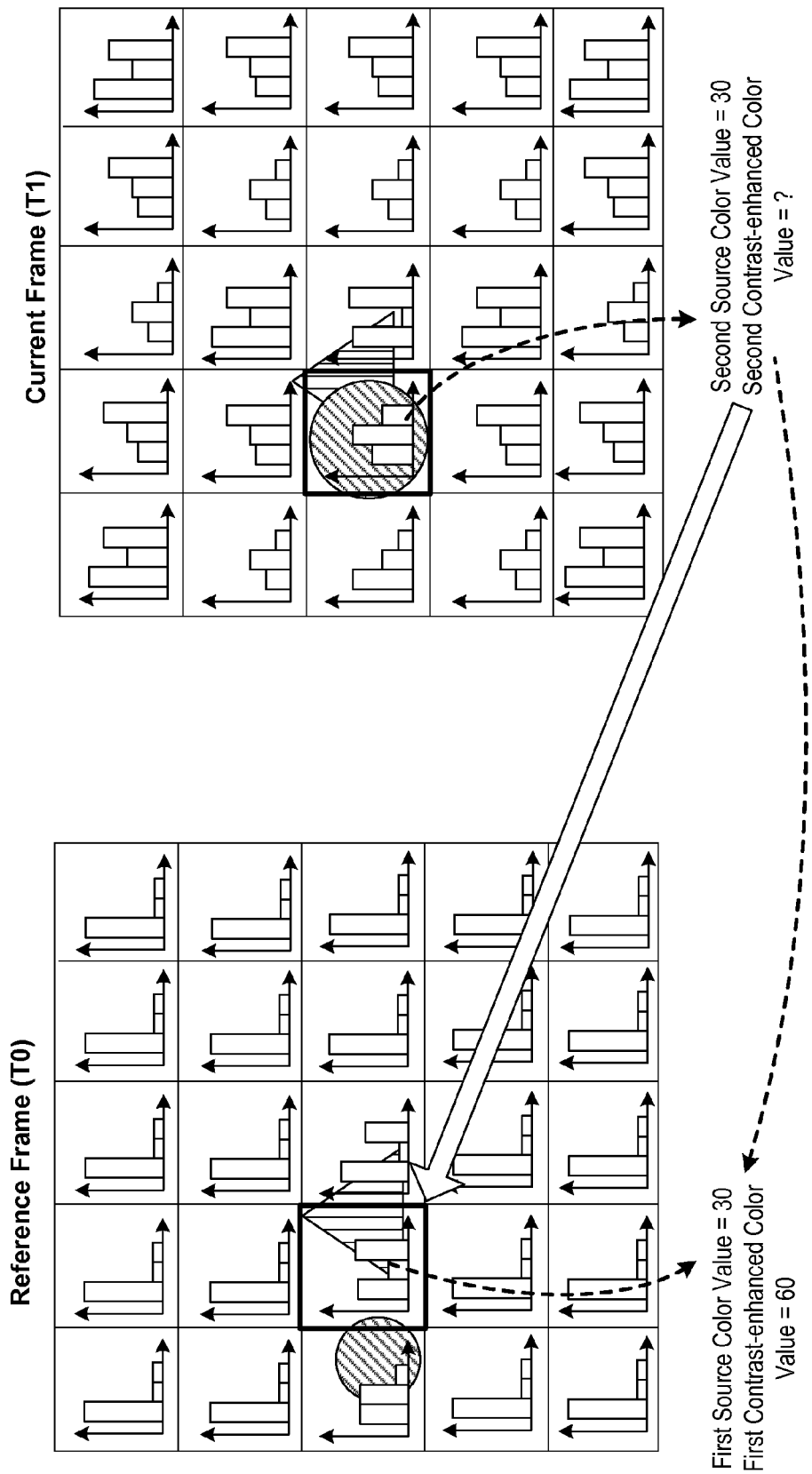
FIG. 7 illustrates local contrast enhancement based on a color mapping function corresponding to a reference frame according to various embodiments of the present disclosure.

Various embodiments are disclosed for performing local contrast enhancement in the color mapping domain while reducing such artifacts as flickering. As shown in FIG. 7, the disclosed local contrast enhancement technique derives a mapping function for a current frame (T1) according to the color distribution in the reference frame (T0). Specifically, a first color mapping function is derived for one or more reference regions in the reference frame according to the corresponding color distribution.

For some embodiments, the first color mapping function comprises, for at least one of a predetermined set of colors, a first source color value and a first contrast-enhanced color value. Each of the first source color value and the first contrast-enhanced color value may comprise a grey level for a one color channel case, a color channel value for a multi-color channel case, a luminance channel value for a multi-color channel case, at least one chrominance channel values for a multi-color channel case, or any combination thereof.

The color channel value for the multi-color channel case comprises a red (R) color value, a green (G) color value, and/or a blue (B) color value in a RGB color space. The color channel value for the multi-color channel case comprises a cyan (C) color value, a magenta (M) color value, a yellow (Y) color value, a key (K) color value in a CMYK color space, or any combination thereof. The color channel value for the multi-color channel case comprises an X tristimulus value, a Y tristimulus value, a Z tristimulus value in a CIE XYZ color space, or any combination thereof.

The color channel value for the luminance channel value for the multi-color channel case comprises a Y luma value in a YCbCr color space, a V value in a hue, saturation, and value (HSV) color space, an I value in a hue, saturation, and intensity (HSI) color space, an L value in a hue, saturation, and lightness (HSL) color space, an L* lightness value in a CIELAB color space, an L* lightness value in an "L*" in CIELUV color space, or any combination thereof.

The color channel value for the chrominance channel value for the multi-color channel case comprises Cb or Cr chroma components in a YCbCr color space, a* or b* components in a CIELAB color space, u* or "v* components in a CIELUV color space, or any combination thereof.

A second color mapping function for one or more regions in the current frame is derived according to the first color mapping function determined for the one or more reference regions in the reference frame. As described in more detail below, the second color mapping function for the current frame may be generated according to a largest area count technique or a weighted average technique. For some embodiments, the second color mapping function is derived not only according to the first color mapping function but also according to the color distribution in the current frame. The second color mapping function is then applied to the one or more regions in the current frame to generate a contrast-enhanced frame.

In accordance with some embodiments, an infinite impulse response (IIR) filter is implemented. In this embodiment, the color mapping function is influenced by all of the color mapping functions of proceeding frames, such as from a scene change standpoint. A third frame may be obtained where the third frame is partitioned into a plurality of regions. A third color mapping function is derived for at least one of the regions in the third frame according to the second color mapping function for at least two regions in the second frame. The third color mapping function is applied to the at least one of the regions in the third frame to generate a contrast-enhanced frame.

Figure 1A:
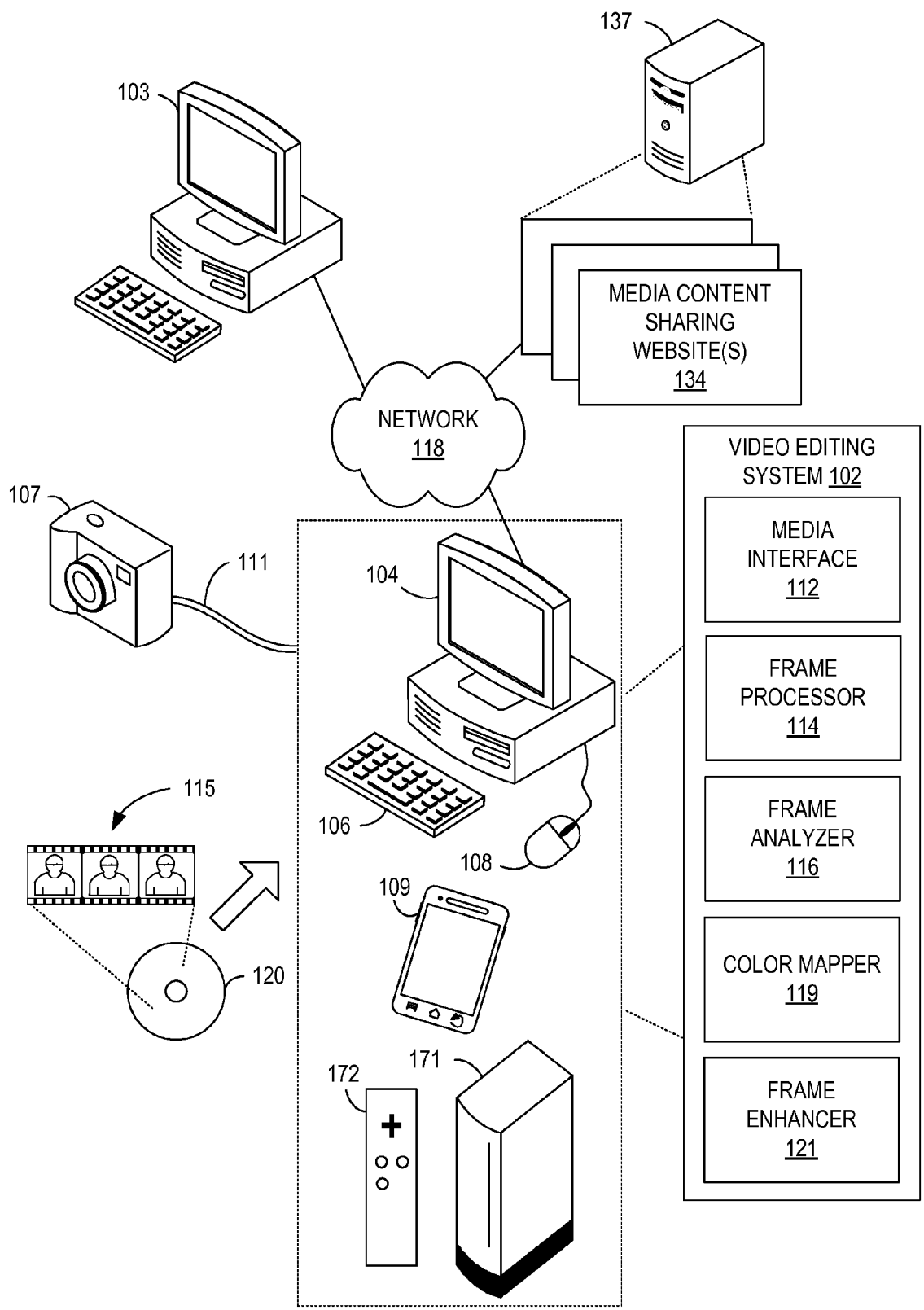
FIG. 1A is a block diagram of an image editing system for performing local contrast enhancement in accordance with various embodiments of the present disclosure.

A description of a system for performing local contrast enhancement is now described followed by a discussion of the operation of the components within the system. FIG. 1A is a block diagram of a video editing system 102 in which embodiments of the techniques for image editing may be implemented. The video editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the video editing system 102 is embodied as a smartphone 109 or tablet, the user may interface with the video editing system 102 via a touchscreen interface (not shown). In other embodiments, the video editing system 102 may be embodied as a video gaming console 171, which includes a video game controller 172 for receiving user preferences. For such embodiments, the video gaming console 171 may be connected to a television (not shown) or other display 104.

The video editing system 102 is configured to retrieve, via a media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), Quick-Time (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1A, the media interface 112 in the video editing system 102 may also be configured to retrieve digital media content 115 directly from a digital recording device 107 where a cable 111 or some other interface may be used for coupling the digital recording device 107 to the video editing system 102. The video editing system 102 may support any one of a number of common computer interfaces, such as, but not limited to IEEE-1394 High Performance Serial Bus (Firewire), USB, a serial connection, and a parallel connection.

The digital recording device 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more media content sharing websites 134 hosted on a server 137 via the network 118 to retrieve digital media content 115.

The components executed on the video editing system 102 include a frame processor 114, a frame analyzer 116, a color mapper 119, a frame enhancer 121, and other applications, services, processes, systems, engines, or functionality not discussed in detail herein. The frame processor 114 is executed to obtain a reference frame and a current frame from the media interface 112 and partition the reference frame into a plurality of reference regions. The frame processor 114 also partitions the current frame into a plurality of reference regions. For some embodiments, the reference frame may comprise any frame preceding the current frame. For other embodiments, the reference frame may comprise any frame following the current frame. Furthermore, both the reference frame and the current frame may be partitioned into the same number of regions.

The frame analyzer 116 is executed to analyze each of the reference regions in the reference frame and determine a color histogram representing a color distribution for each reference region, where the color histogram may indicate the number of pixels within each reference region that have colors in each of a set of colors. In particular, the color histogram may indicate the number of pixels that have a color, Ck, where k=1 to N, and where N represents the total number of colors in the set.

The color mapper 119 is executed to derive a first color mapping function for each reference region in the reference frame according to the corresponding color distribution determined by the frame analyzer 116. The color mapper 119 is further configured to derive a second color mapping function for the current frame according to the first color mapping function generated for the reference frame. The frame enhancer 121 is executed to apply the second color mapping function to the current frame to generate a contrast-enhanced frame.

Figure 1B:
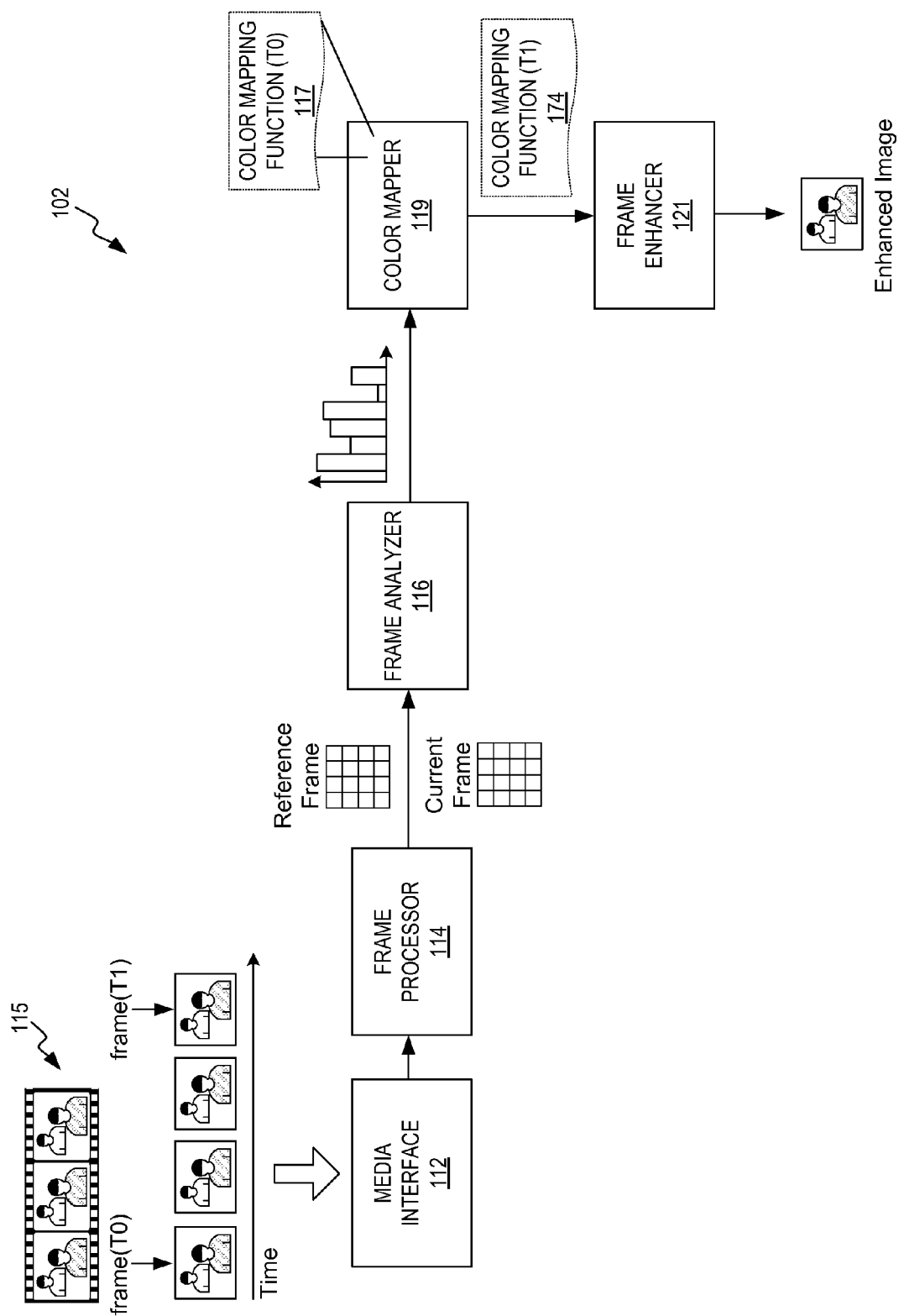
FIG. 1B illustrates the process flow between various components of the image editing system of FIG. 1A in accordance with various embodiments of the present disclosure.

Having described various components of the video editing system 102, the process flow between the various components is now described in more detail. Reference is made to FIG. 1B, which illustrates various components of the video editing system 102 in FIG. 1A. To begin, the media interface 112 obtains media content 115 comprising, for example, a series of frames in a video file. For some embodiments, the media interface 112 provides the frame processor 114 with a reference frame at time T0 and a current frame at time T1, where the reference frame may comprise any frame preceding the current frame, or any frame following the current frame. For some embodiments, neighboring frames may be selected. Note, however, that frames other then neighboring frames may also be selected.

The frame processor 114 partitions the reference frame into a plurality of reference regions. For some embodiments, each reference region comprises an N×N pixel block. The frame processor 114 also partitions the current frame into a plurality of regions, where each region of the current frame may also comprise an N×N pixel block. In this regard, the reference frame and the current frame may both be partitioned into the same number of regions.

The frame analyzer 116 receives the partitioned reference frame and analyzes the color distribution of each individual reference region in the reference frame to derive a color histogram for each reference frame. As discussed above, the color histogram may indicate the number of pixels that have a color, Ck, where k=1 to N, and where N represents the total number of colors in the set. The color mapper 119 generates a color mapping function 117 for each reference region based on the color histogram information.

The color mapper 119 then derives a color mapping function 174 for each region in the current frame based on the color mapping function 117 generated for each reference region in the reference frame. The color mapping function 174 for the current frame may be generated according to a largest area count technique or a weighted average technique. For embodiments incorporating the largest area count technique, the color mapper 119 determines, for each color value Ck, the pixel count value of the region in the current frame by searching for the region within the reference frame with the highest pixel count value for the color Ck specified in the histogram information derived by the frame analyzer 116.

Figure 3:
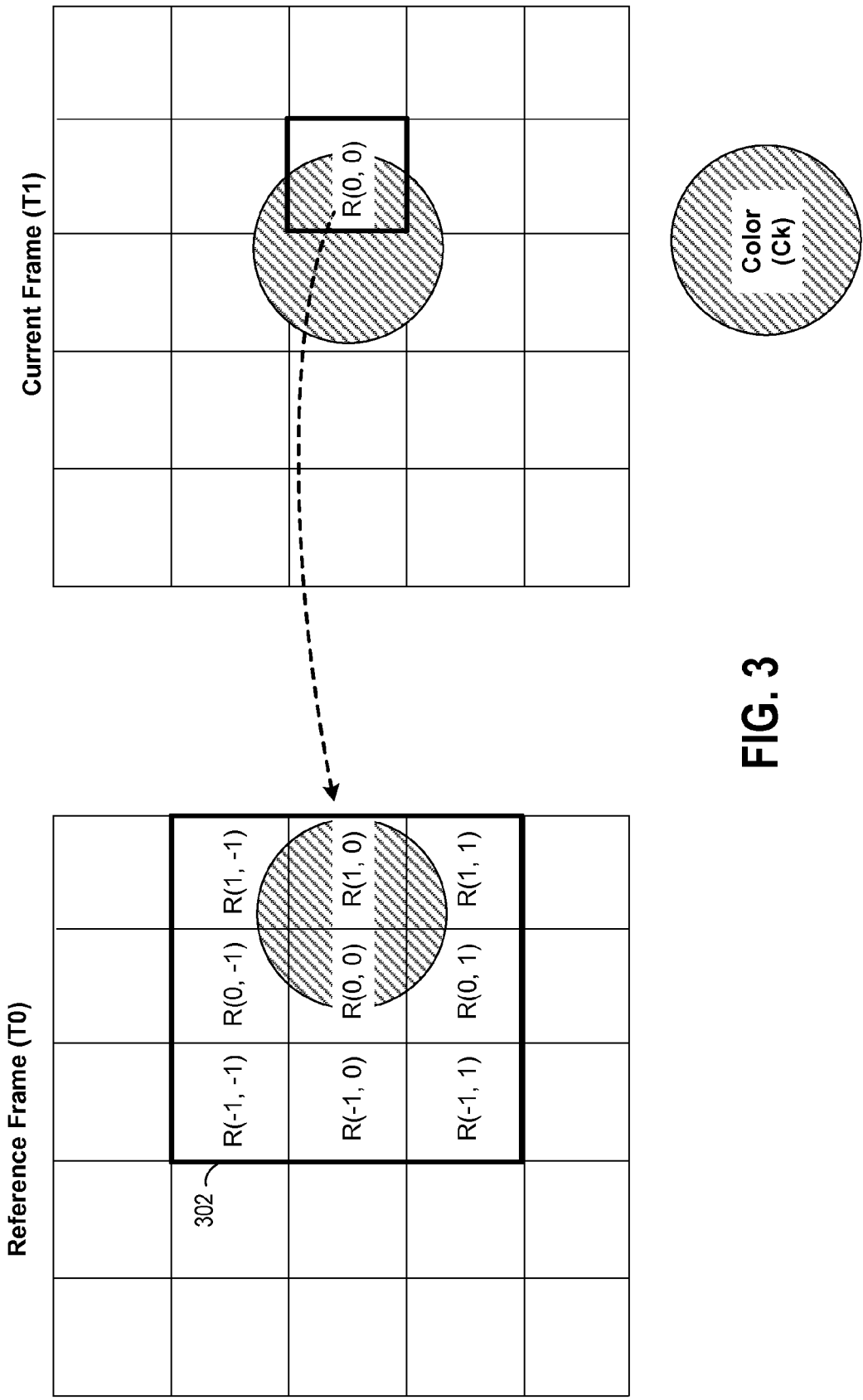
FIG. 3 illustrates determination of pixel count values in accordance with various embodiments of the present disclosure.

To further illustrate, reference is made to FIG. 3, which depicts a reference frame and a current frame, where both frames are partitioned into a plurality of regions. For purposes of illustration, the circle object shown in FIG. 3 corresponds to a particular color (e.g., color Ck) present in both the reference frame and the current frame. In accordance with embodiments incorporating the largest area count technique, the color mapper 119 searches the regions in the reference frame. For some embodiments, the color mapper 119 may begin the search by concentrating on a search region 302 defined around the corresponding region in the current frame, R(0,0).

In the illustration shown, the search region 302 includes all the regions spanning from region R (−1,−1) to region R (1,1)

in the reference frame. The color mapper 119 searches each of these regions and identifies the region with the highest pixel count for color Ck. For this example, the color mapper 119 determines that region R(1,0) contains the highest count value of color Ck. Based on this search result, the color mapper 119 assigns the pixel count value for color Ck in the current frame to the pixel count value of region R(1,0) in the reference frame. This process is repeated for each color in the current frame, and a color mapping function for the current frame is generated.

For some embodiments, a weighted average technique may be used for assigning pixel count values. In accordance with such embodiments, the color mapper 119 assigns the pixel count value for color Ck in the current frame to a weighted average of the pixel count values of all the regions in the search region 302 in the reference frame where the weight value for each region in the search region 302 is determined according to the corresponding pixel count value for that particular color (Ck). Thus, for example, for color Ck represented by the circle object, region R(−1,−1) would have a relatively low weight value assigned to the corresponding pixel count value for color Ck since the circle object does not overlap that region. On the other hand, region R1,0) would be assigned a relatively high weight value since that region contains a high pixel count value for color Ck. The pixel count value for color Ck for the current frame would comprise a weighted average of the pixel count values in the search region 302. Note that the search region 302 may comprise a subset of the frame or the entire frame.

Figure 2:
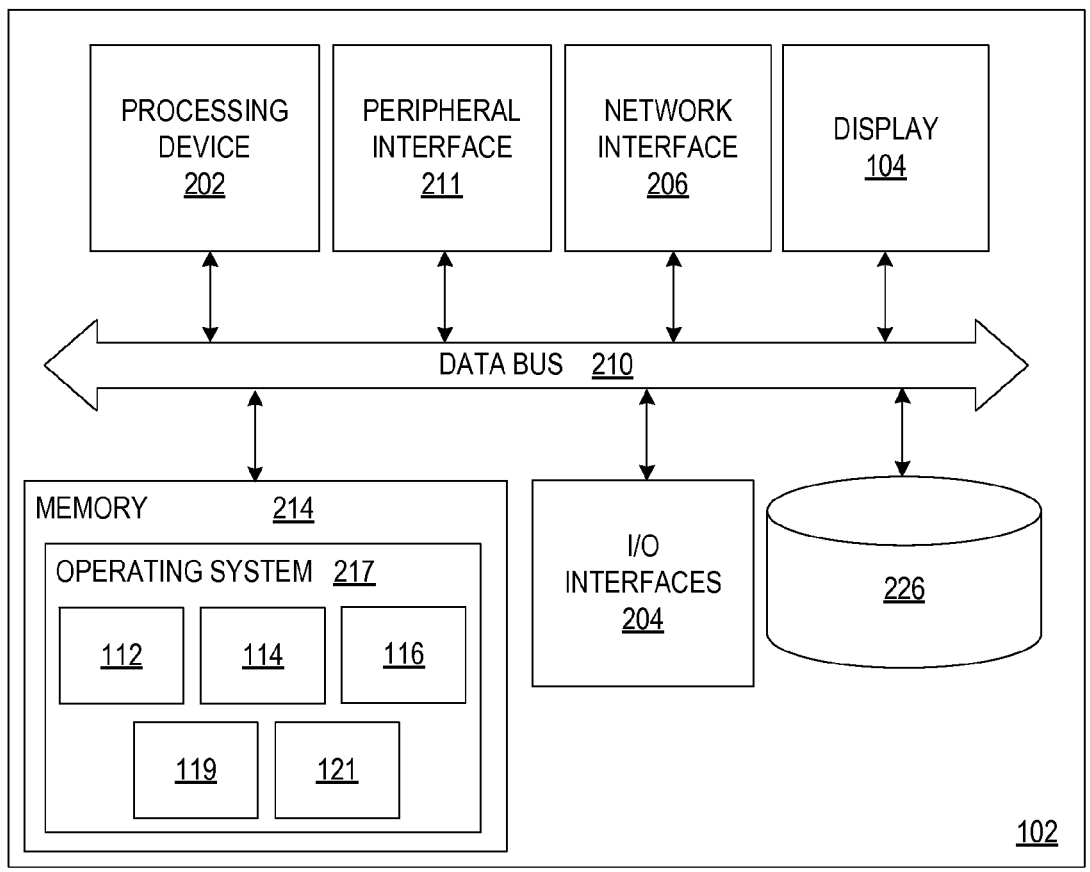
FIG. 2 is a detailed view of the image editing system of FIG. 1A in accordance with various embodiments of the present disclosure.

FIG. 2 is a schematic diagram of the video editing system 102 shown in FIG. 1A. The video editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, frame processor 114, frame analyzer 116, color mapper 119, frame enhancer 121) of the video editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1A). The video editing system 102 may further comprise mass storage 226. The peripheral interface 211 supports various interfaces including, but not limited to IEEE-1394 High Performance Serial Bus (Firewire), USB, a serial connection, and a parallel connection.

Figure 4:
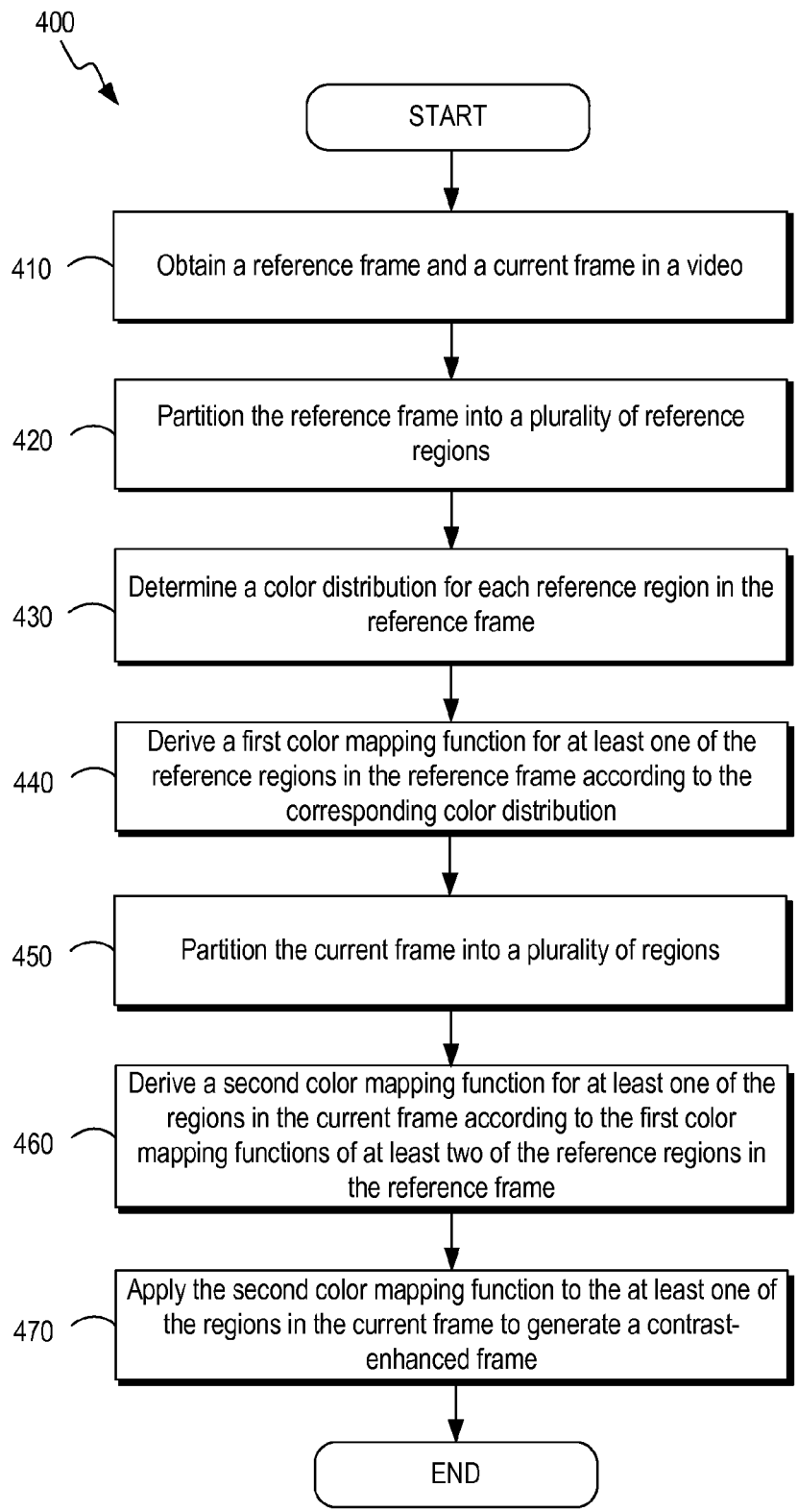
FIG. 4 is a top-level flowchart illustrating examples of functionality implemented as portions of the video editing system of FIG. 1A for facilitating local contrast enhancement according to various embodiments of the present disclosure.

Reference is made to FIG. 4, which is a flowchart 400 in accordance with one embodiment for facilitating local contrast enhancement performed by the video editing system 102 of FIG. 1A. It is understood that the flowchart 400 of FIG. 4 provides merely an example of the many different types of functional arrangements that may be employed to implement the operation of the various components of the video editing system 102 (FIG. 1A). As an alternative, the flowchart of FIG. 4 may be viewed as depicting an example of steps of a method implemented in the video editing system 102 according to one or more embodiments.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

Beginning with block 410, the media interface 112 (FIG. 1A) obtains a reference frame and a current frame, where the first frame is designated as a reference frame and the second frame is designated as a current frame. In block 420, the frame processor 114 (FIG. 1A) partitions the reference frame into a plurality of reference regions. In block 430, the frame analyzer 116 (FIG. 1A) determines the color distribution for each reference region in the reference frame. In block 440, the color mapper 119 (FIG. 1A) derives a first color mapping function for at least one of the reference regions in the reference frame according to the corresponding color distribution, where the first color mapping function comprises, for at least one of a predetermined set of colors, a first source color value and a first contrast-enhanced color value.

In block 450, the frame processor 114 partitions the current frame into a plurality of regions, and in block 460, the color mapper 119 derives a second color mapping function for at least one of the regions in the current frame according to the first color mapping functions of at least two of the reference regions in the reference frame. In block 470, the frame enhancer 121 (FIG. 1A) applies the second color mapping function to the at least one of the regions in the current frame to generate a contrast-enhanced frame.

Figure 8:
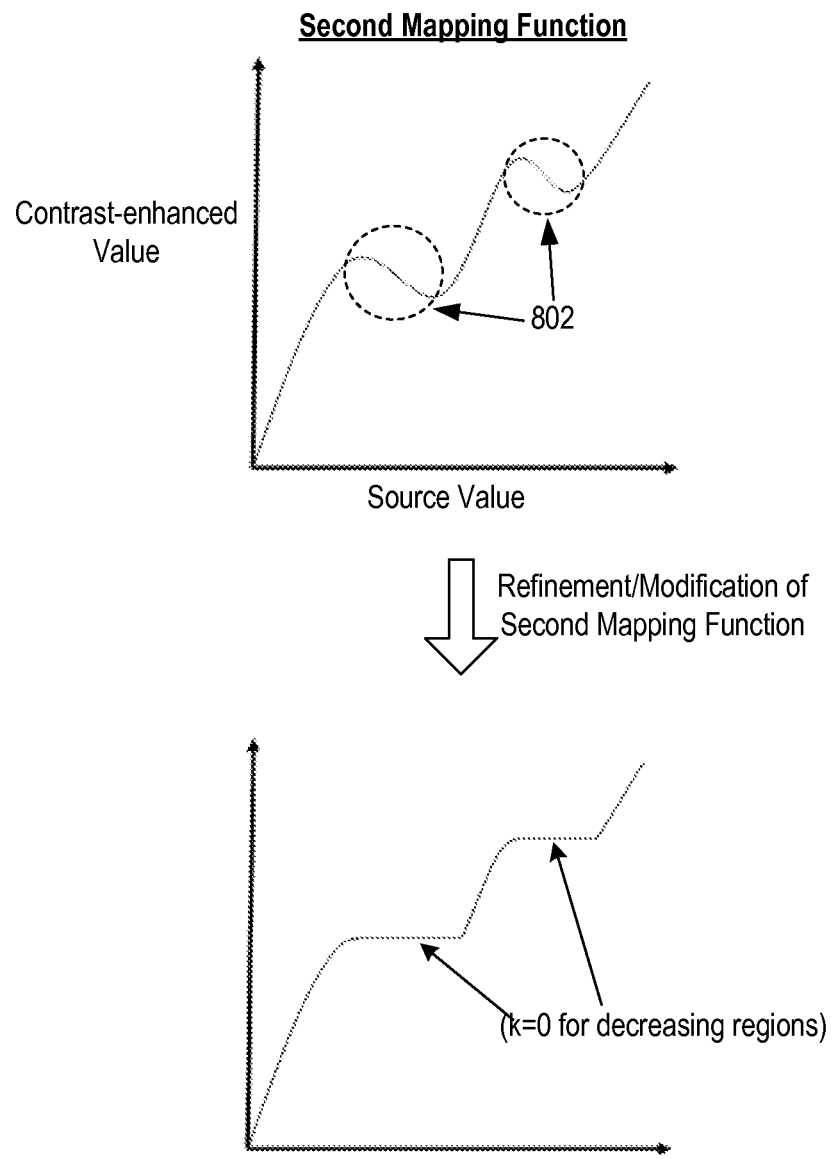
FIG. 8 illustrates refinement/modification of the second color mapping function corresponding to a reference frame according to various embodiments of the present disclosure.

FIG. 8 illustrates refinement/modification of the second color mapping function corresponding to a reference frame according to various embodiments of the present disclosure. In accordance with some embodiments, the second color mapping function derived for at least one of the regions in the current frame according to the first color mapping function is modified. Notably, if the second color mapping function (i.e., the curve illustrated in the upper graph in FIG. 8) is not an increasing function, undesirable side effects may occur. To illustrate, consider the brightness level as an example. A region that is supposed to be in a shadow region (i.e., a darker region) may erroneously appear brighter than its adjacent region as a result of local contrast enhancement. Thus, modification of the second color mapping may be applied in cases where the second color mapping function is not increasing. Regions where the second mapping function decreases denotes that each color is being processed independently.

First, a determination is made on whether the second mapping function is an increasing function by determining whether at least a portion of the second mapping function exhibits a negative slope value. In the example of FIG. 8, the second mapping function corresponds to a plot of the contrast-enhanced value versus the source value. As shown, the second mapping function includes regions 802 where the slope is negative. For some embodiments, the second mapping function is refined or modified by setting the slope of those regions 802 to a non-negative value. Specifically, the second mapping function may be modified according to the following expressions:

$$f'_{refined}(x) = \begin{cases} f'_{original}(x), & \text{for } f'_{original}(x) \geq 0 \\ k, & \text{for } f'_{original}(x) < 0 \end{cases}$$

$$f_{refined}(x) = \int_{x=min}^{x=max} f'_{refined}(x)\, dx$$

In the expressions above, $f_{original}()$ represents the second mapping function, $f'_{original}()$ represents a first derivative of $f_{original}()$, $f_{refined}()$ represents the modified second color mapping function, $f'_{refined}()$ represents a first derivative of $f_{refined}()$ and notations min and max respectively represent the minimum and maximum values of the predetermined set of colors, and wherein k represents a slope of the modified second color mapping function, and k≥0.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A local contrast enhancement method performed in a video editing system, comprising:
    obtaining a first frame and a second frame in a video, wherein the first frame is designated as a reference frame and the second frame is designated as a current frame;
    partitioning the reference frame into a plurality of reference regions;
    determining a color distribution for at least one of the reference regions in the reference frame;
    deriving a first color mapping function for at least one of the reference regions in the reference frame according to the corresponding color distribution, wherein the first color mapping function comprises, for at least one of a predetermined set of colors, a first source color value and a first contrast-enhanced color value;
    partitioning the current frame into a plurality of regions;
    deriving a second color mapping function for at least one of the regions in the current frame according to the first color mapping functions of at least two of the reference regions in the reference frame; and
    applying the second color mapping function to the at least one of the regions in the current frame to generate a contrast-enhanced frame.

2. The method of claim 1, wherein the second color mapping function is derived for at least one color value in the at least one of the regions of the current frame.

3. The method of claim 1, wherein determining the color distribution comprises determining pixel count values for each color in the predetermined set of colors in the at least one of reference regions of the reference frame.

4. The method of claim 1, wherein the reference frame comprises one of a frame preceding the current frame and a frame following the current frame.

5. The method of claim 1, wherein the at least two of the reference regions in the reference frame are located spatially near a position of the at least one of the regions in the current frame.

6. The method of claim 1, wherein deriving the second color mapping function comprises:
    obtaining, for a current color, the first contrast-enhanced color value from the first color mapping function of the reference region with a largest pixel count value corresponding to the current color across the at least two reference regions; and
    setting a second contrast-enhanced color value for the current color in the second color mapping function to the obtained first contrast-enhanced color value.

7. The method of claim 1, wherein deriving the second color mapping function comprises:
    obtaining, for a current color, the first contrast-enhanced color values from the first color mapping functions of at least two reference regions;

setting a second contrast-enhanced color value for the current color of the second color mapping function to a weighting average of the obtained first contrast-enhanced color values across the at least two reference regions.

8. The method of claim 7, wherein weight values of the weighting average are determined according to pixel count values of at least two reference regions in the reference frame.

9. The method of claim 1, wherein the reference frame and the current frame are each partitioned into a same number of regions.

10. The method of claim 1, wherein each of the first source color value and the first contrast-enhanced color value comprises one of: a grey level for a one color channel case, a color channel value for a multi-color channel case, a luminance channel value for a multi-color channel case, and at least one chrominance channel values for a multi-color channel case, or any combination thereof.

11. The method of claim 1, further comprising:
determining whether the second color mapping function is an increasing function; and
in response to determining that the second color mapping function is not an increasing function, converting the second color mapping function into an increasing function.

12. The method of claim 11, converting the second color mapping function into an increasing function comprises modifying the second color mapping function according to the following expression:

$$f'_{refined}(x) = \begin{cases} f'_{original}(x), & \text{for } f'_{original}(x) \geq 0 \\ k, & \text{for } f'_{original}(x) < 0 \end{cases}$$

$$f_{refined}(x) = \int_{x=min}^{x=max} f'_{refined}(x) \, dx$$

wherein $f_{original}()$ represents the second mapping function, $f'_{original}()$ represents a first derivative of $f_{original}()$, $f_{refined}()$ represents the modified second color mapping function, $f'_{refined}()$ represents a first derivative of $f_{refined}()$ and notations min and max respectively represent the minimum and maximum values of the predetermined set of colors, and wherein k represents a slope of the modified second color mapping function, and $k \geq 0$.

13. The method of claim 1, further comprising:
obtaining a third frame;
partitioning the third frame into a plurality of regions;
deriving a third color mapping function for at least one of the regions in the third frame according to the second color mapping functions for at least two regions in the second frame; and
applying the third color mapping function to the at least one of the regions in the third frame to generate a contrast-enhanced frame.

14. The method of claim 1, further comprising:
determining a color distribution for at least one of the regions in the current frame; and
deriving a second color mapping function for at least one of the regions in the current frame according to the first color mapping functions for at least two of the reference regions in the reference frame and the color distribution for at least one of the regions in the current frame.

15. A system for performing local contrast enhancement, comprising:
a processor; and
at least one application executable in the processor, the at least one application comprising:
a media interface for obtaining a reference frame and a current frame in a video;
a frame processor for partitioning the reference frame into a plurality of reference regions;
a frame analyzer for determining a color distribution for at least one of the reference regions in the reference frame;
a color mapper for deriving a first color mapping function for at least one of the reference regions in the reference frame according to the corresponding color distribution, wherein the first color mapping function comprises, for at least one of a predetermined set of colors, a first source color value and a first contrast-enhanced color value, wherein the frame processor is further configured to partition the current frame into a plurality of regions, wherein the color mapper is further configured to derive a second color mapping function for at least one of the regions in the current frame according to the first color mapping function for at least two of the reference regions in the reference frame; and
a frame enhancer for applying the second color mapping function to the at least one of the regions in the current frame to generate a contrast-enhanced frame.

16. The system of claim 15, wherein the second color mapping function is derived for at least one color value in the at least one of the regions of the current frame.

17. The system of claim 15, wherein frame analyzer determines the color distribution by determining pixel count values for the predetermined set of colors in the at least one of reference regions of the reference frame.

18. The system of claim 15, wherein the reference frame comprises one of a frame preceding the current frame and a frame following the current frame.

19. The system of claim 15, wherein the at least two of the reference regions in the reference frame are located spatially near a position of the at least one of the regions in the current frame.

20. The system of claim 15, wherein the color mapper derives the second color mapping function by performing the steps of:
obtaining, for a current color, the first contrast-enhanced color value from the first color mapping function of the reference region with a largest pixel count value corresponding to the current color; and
setting a second contrast-enhanced color value for the current color of the second color mapping function to the obtained first contrast-enhanced color value.

21. The system of claim 15, wherein the color mapper derives the second color mapping function by obtaining, for a current color, the first contrast-enhanced color values from the first color mapping function of at least two reference regions and setting a second contrast-enhanced color value for the current color of the second color mapping function to a weighting average of the obtained first contrast-enhanced color values across the at least two reference regions.

22. The system of claim 21, wherein weight values of the weighting average are determined according to pixel count values of at least two reference regions in the reference frame.

23. A non-transitory computer-readable medium embodying a program executable in a computing device, comprising:
code that obtains a reference frame and a current frame in a video;
code that partitions the reference frame into a plurality of reference regions;
code that determines a color distribution for at least one of the reference regions in the reference frame;
code that derives a first color mapping function for at least one of the reference regions in the reference frame according to the corresponding color distribution, wherein the first color mapping function comprises, for at least one of a predetermined set of colors, a first source color value and a first contrast-enhanced color value;

code that partitions the current frame into a plurality of regions;

code that derives a second color mapping function for at least one of the regions in the current frame according to the first color mapping function for at least two of the reference regions in the reference frame; and code that applies the second color mapping function to the at least one of the regions in the current frame to generate a contrast-enhanced frame.

24. The non-transitory computer-readable medium of claim 23, wherein the second color mapping function is derived for at least one color value in the at least one of the regions of the current frame.

25. The non-transitory computer-readable medium of claim 23, wherein determining the color distribution comprises determining pixel count values for the predetermined set of colors in the at least one of reference regions of the reference frame.

26. The non-transitory computer-readable medium of claim 23, wherein the reference frame comprises one of a frame preceding the current frame and a frame following the current frame.

27. The non-transitory computer-readable medium of claim 23, wherein the at least two of the reference regions in the reference frame are located spatially near a position of the at least one of the regions in the current frame.

28. The non-transitory computer-readable medium of claim 23, wherein the code that derives the second color mapping function is further configured to:

obtain, for a current color, the first contrast-enhanced color value from the first color mapping function of the reference region with a largest pixel count value corresponding to the current color; and set a second contrast-enhanced color value for the current color of the second color mapping function to the obtained first contrast-enhanced color value.

29. The non-transitory computer-readable medium of claim 23, wherein the code that derives the second color mapping function is further configured to:

obtain, for a current color, the first contrast-enhanced color values from the first color mapping function of at least two reference regions; and set a second contrast-enhanced color value for the current color of the second color mapping function to a weighted average of the obtained first contrast-enhanced color values across the at least two reference regions.

30. The non-transitory computer-readable medium of claim 29, wherein weight values of the weighted average are determined according to pixel count values of at least two reference regions in the reference frame.

* * * * *